US006823132B2

(12) United States Patent
Saito et al.

(10) Patent No.: US 6,823,132 B2
(45) Date of Patent: Nov. 23, 2004

(54) METHOD AND APPARATUS FOR CONTROLLING MOTOR

(75) Inventors: Hiroyuki Saito, Kanagawa (JP); Nobutsune Kobayashi, Kanagawa (JP); Michiharu Shoji, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 11 days.

(21) Appl. No.: 10/144,937

(22) Filed: May 15, 2002

(65) Prior Publication Data
US 2002/0172511 A1 Nov. 21, 2002

(30) Foreign Application Priority Data
May 17, 2001 (JP) ........................................ 2001-148344

(51) Int. Cl.[7] ............................. H02P 5/06; G05F 1/10
(52) U.S. Cl. ...................... 388/806; 318/685; 318/603; 318/265; 101/485; 400/279
(58) Field of Search .............................. 388/800, 804, 388/806; 318/685, 696, 599, 603, 268–275; 347/5; 400/279, 903; 101/485

(56) References Cited

U.S. PATENT DOCUMENTS

| 4,146,922 A | * | 3/1979 | Brown et al. ............... 318/599 |
| 4,490,796 A | * | 12/1984 | Bigbie et al. ............... 318/599 |
| 4,524,364 A | | 6/1985 | Bain et al. |
| 4,862,284 A | | 8/1989 | Murata |
| 4,869,610 A | * | 9/1989 | Nishizawa et al. ......... 318/685 |
| 4,988,935 A | | 1/1991 | York |
| 5,122,003 A | | 6/1992 | Matsumoto et al. |
| 5,207,520 A | * | 5/1993 | Tanaka ...................... 388/804 |
| 5,325,028 A | | 6/1994 | Davis |
| 5,331,264 A | | 7/1994 | Cheng et al. |
| 5,559,412 A | | 9/1996 | Schuler |
| 5,781,451 A | | 7/1998 | Lofthus et al. |
| 5,804,941 A | | 9/1998 | Ray |
| 5,998,956 A | | 12/1999 | Saito |
| 6,014,285 A | | 1/2000 | Okamura |
| 6,065,830 A | | 5/2000 | Hiramatsu et al. |
| 6,114,825 A | | 9/2000 | Katz |
| 6,429,996 B1 | | 8/2002 | Iwashiro |
| 6,498,698 B1 | | 12/2002 | Golowka et al. |
| 6,554,395 B2 | | 4/2003 | Cole et al. |
| 2002/0171702 A1 | | 11/2002 | Kobayaski et al. |
| 2003/0095354 A1 | | 5/2003 | Atsumi et al. |

FOREIGN PATENT DOCUMENTS

| EP | 0 312 324 | 4/1989 | |
| EP | 0 373 558 | 6/1990 | |
| EP | 0 666 179 | 8/1995 | |
| JP | 01026386 A | * 1/1989 | ............. H02P/5/06 |
| JP | 09202014 A | * 8/1997 | ............. B41J/19/18 |
| JP | 2000056634 A | * 2/2000 | ............ G03G/21/00 |
| JP | 2001246827 A | * 9/2001 | ............ B41L/13/16 |

* cited by examiner

*Primary Examiner*—Rina Duda
*Assistant Examiner*—Eduardo Colon Santana
(74) *Attorney, Agent, or Firm*—Fitzpatrick, Cella, Harper & Scinto

(57) ABSTRACT

In controlling a motor in a device which drives a mechanism using the motor as a power source, pre-driving of giving a predetermined driving parameter to the motor and driving the mechanism is executed. During the pre-driving, movement of the mechanism is monitored, and a command value to the motor, which is necessary for starting the mechanism, is obtained. Driving of the motor is controlled using feedback using the command value as the initial value of the driving parameter. High-speed accurate position control can be achieved independently of the individual difference in an object to be controlled and the frictional force of the mechanical portion or the difference in use environment.

16 Claims, 12 Drawing Sheets

METHOD AND APPARATUS FOR CONTROLLING MOTOR

FIELD OF THE INVENTION

The present invention relates to a method and apparatus for controlling a motor and, more particularly, to positioning executed when a mechanism is driven using a motor as a power source.

BACKGROUND OF THE INVENTION

Currently, motors are used as power sources of various apparatuses. Especially, many OA devices and home electric appliances use DC motors because they have simple structures, require no maintenance, generate little rotation variation and vibration, and are capable of high-speed operation and accurate control.

In recent years, printers, and especially general commercial printers that are often for home use, are required to have not only higher image quality but also lower operation noise. Noise generated in operation includes that generated in printing and that generated in driving mechanical portions. In inkjet printing apparatuses which have only a few noise sources in printing, noise generated in driving mechanical portions is reduced.

An inkjet printing apparatus has, as its main mechanical portions, a printhead scanning mechanism and a printing medium convey mechanism. Noise is reduced by using a DC motor and linear encoder as a driving means for the printhead scanning mechanism. Today, a DC motor and rotary encoder are also being employed as a driving means for the printing medium convey mechanism in many cases.

From the viewpoint of noise reduction, an effect can be expected when a DC motor is employed. From the viewpoint of accurate printing medium conveyance, more advanced position control is required in addition to a mechanical accuracy.

To control the position of a DC motor, the motor is basically powered off when the rotation (angle) of a roller has reached a target position, thereby stopping the motor by inertia.

To ensure stop position accuracy in a mechanism using a DC motor, deceleration before stop and removal of disturbance torque before stop (i.e., stable low-speed operation immediately before stop) are indispensable. When the motor is powered off at a constant and sufficiently low speed, the settling time until stop and stop position accuracy can be stabilized.

To stabilize the speed immediately before stop, stable control must be executed before it. Hence, stable control is preferably realized immediately after the start of control, i.e., from the start time of movement.

However, a printing medium convey mechanism is required to stably convey various kinds of printing media in different sizes and materials and is therefore designed upon assuming a load with a certain magnitude. To move this object, such a force must be applied that the object can move against the static frictional force.

As a feedback control method, PID control is generally known. In this method, integral processing is performed. The magnitude of a thus calculated transient variable (to be referred to as an integral compensation amount hereinafter) is closely related to the magnitude of the output current, i.e., the final calculation result. The integral compensation amount has a value that changes as the time elapses. If its initial value is 0, a long time is consumed until the initial value reaches an integral compensation amount value corresponding to an output current at which the driving force beyond the static frictional force can be obtained.

In addition, there are various kinds of printing media, as described above, and the frictional force generated due to the operation of the convey mechanism itself also individually changes. For this reason, the integral compensation amount corresponding to the output current necessary for actually starting a printing medium also takes various values. That is, when its initial value is 0, the moving start time of a printing medium becomes delayed, and the moving start time varies, making the entire control unstable.

To solve this problem, an appropriate value is preferably set in advance as the initial value. However, the initial value is very difficult to uniquely set because of factors such as a variation in frictional force generated by the operation of the convey mechanism of an individual printer and a change due to the use environment, as described above.

Hence, when a single fixed value is set as the initial value of one product, the initial value may be too large for a printing medium to be conveyed and too small for another printing medium because of the above factors. When the initial value is larger than the optimum value, the speed overshoots at the time of acceleration, resulting in unstable control. On the other hand, when the initial value is smaller than the optimum value, the moving start time of a printing medium is delayed, and the moving start time varies, like the case wherein the initial value is 0.

SUMMARY OF THE INVENTION

The present invention has been made in consideration of the above situation, and has as its object to provide a motor control method and apparatus which allow high-speed accurate position control independently of the individual difference in an object to be controlled and the frictional force of a mechanical portion or the difference in use environment.

In order to achieve the above object, a motor control method according to an aspect of the present invention is a motor control method in a device which drives a mechanism using a motor as a power source, characterized by comprising: the pre-driving step of giving a predetermined driving parameter to the motor and driving the mechanism; the command value detection step of, in the pre-driving step, monitoring movement of the mechanism and obtaining a command value to the motor, which is necessary for starting the mechanism; and the control step of controlling driving of the motor using feedback using the command value as an initial value of the driving parameter.

In order to achieve the above object, a motor control apparatus according to an aspect of the present invention is a motor control apparatus in a device which drives a mechanism using a motor as a power source, characterized by comprising: pre-driving means for giving a predetermined driving parameter to the motor and driving the mechanism; command value detection means for, during the pre-driving, monitoring movement of the mechanism and obtaining a command value to the motor, which is necessary for starting the mechanism; and control means for controlling driving of the motor using feedback using the command value as an initial value of the driving parameter.

In the present invention, in controlling a motor in a device which drives a mechanism using the motor as a power source, a predetermined driving parameter is given to the motor, and pre-driving of the mechanism is executed. During pre-driving, the movement of the mechanism is monitored, and a command value to the motor, which is necessary for starting the mechanism, is obtained. Driving of the motor is controlled by feedback control using the command value as the initial value of the driving parameter.

With this arrangement, the initial value of the driving parameter appropriate for starting the mechanism is obtained independently of the individual difference in frictional force of the mechanical portion to be controlled or the difference in use environment. Control is executed using this value.

Hence, high-speed accurate position control can be achieved independently of the individual difference in an object to be controlled and the frictional force of a mechanical portion or the difference in use environment.

Preferably, in the pre-driving step, a predetermined speed command value is given, and feedback control by speed servo is executed, and in the command value detection step, an integral compensation amount is obtained as the command value.

In that case, the predetermined speed command value equals a final speed command value to be given immediately before stop in the control step.

Preferably, the method further comprises the profile generation step of generating an ideal position profile representing a relationship between time and a position and an ideal speed profile representing a relationship between time and a speed, and in the control step, the driving is controlled in four regions including an acceleration region, a constant speed region, deceleration region, and a positioning region, the motor is driven in accordance with the ideal position profile in the acceleration region, constant speed region, and deceleration region, and the motor is driven in accordance with the ideal speed profile in the positioning region.

Preferably, the motor is a DC motor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings. A serial inkjet printer having a printhead with a detachable ink tank will be exemplified.

In the embodiment, the motor control method of the present invention is applied to control a line feed motor for printing medium conveyance.

Figure 1:
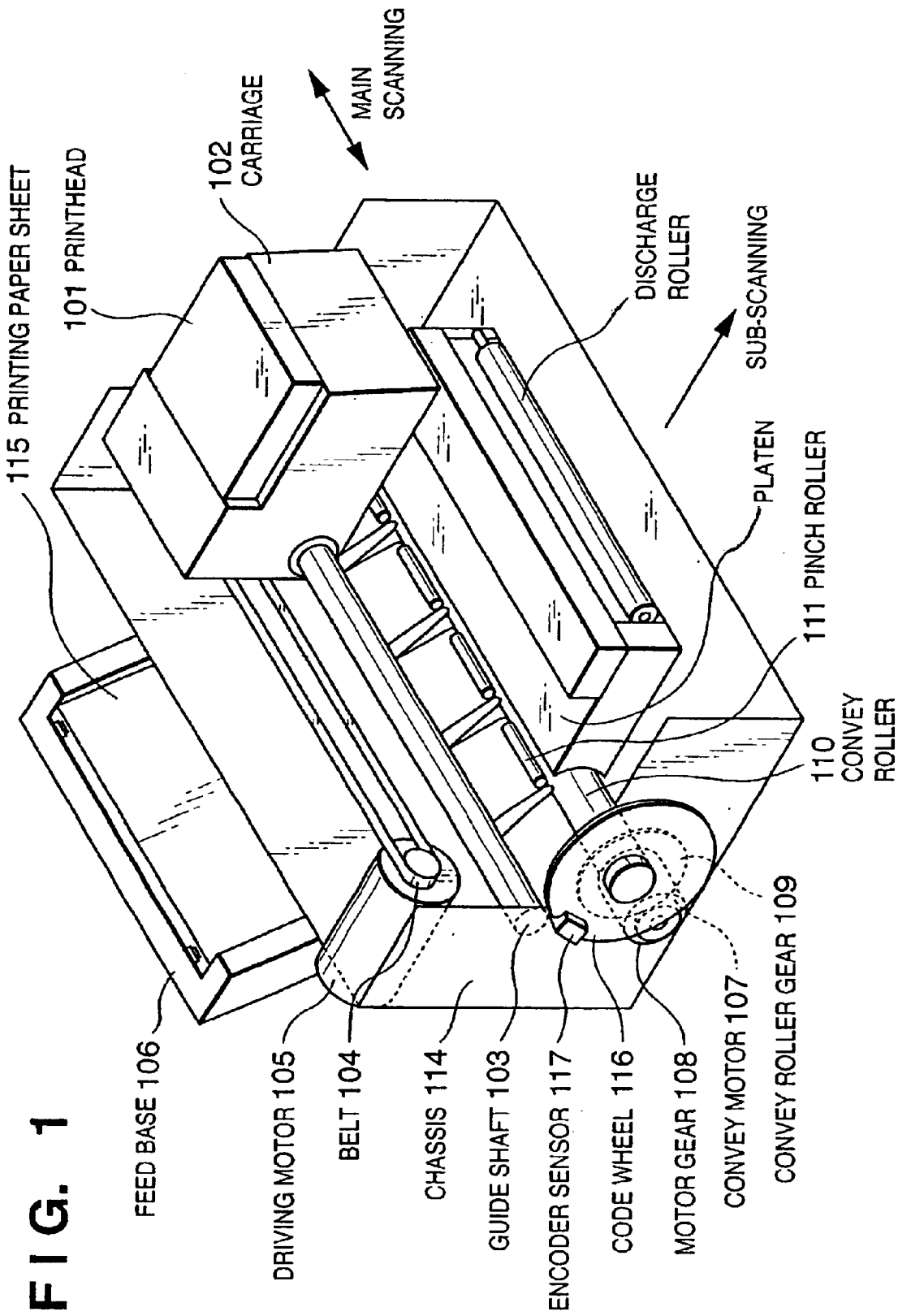
FIG. 1 is a perspective view showing the overall arrangement of a serial inkjet printer according to an embodiment of the present invention.

FIG. 1 is a perspective view showing the overall arrangement of the serial inkjet printer. Referring to FIG. 1, a printhead 101 has an ink tank. The printhead 101 is mounted on a carriage 102. A guide shaft 103 is inserted to the bearing portion of the carriage 102 so as to be slidable in the main scanning direction. The two ends of the shaft are fixed to a chassis 114. A driving motor 105 serving as a carriage driving means transmits driving power through a belt 104 serving as a carriage drive transmission means engaged with the carriage 102 so that the carriage 102 can move in the main scanning direction.

In a printing standby state, printing paper sheets 115 are stacked on a feed base 106. At the start of printing, a printing paper sheet is fed by a feed roller (not shown). To convey the fed printing paper sheet, a convey roller is rotated by the driving force of a paper convey motor (107), i.e., a DC motor through a gear train (motor gear 108 and convey roller gear 109) serving as a transmission means. The printing paper sheet 115 is conveyed by an appropriate feed amount by a convey roller 110 and pinch rollers 111 that are pressed by the convey roller 110 and makes follow-up rotation. The convey amount is managed by detecting and counting, with an encoder sensor 117, slits of a code wheel (rotary encoder film 116) pressed and fitted into the convey roller gear 109. Hence, accurate feeding is possible.

Figure 2:
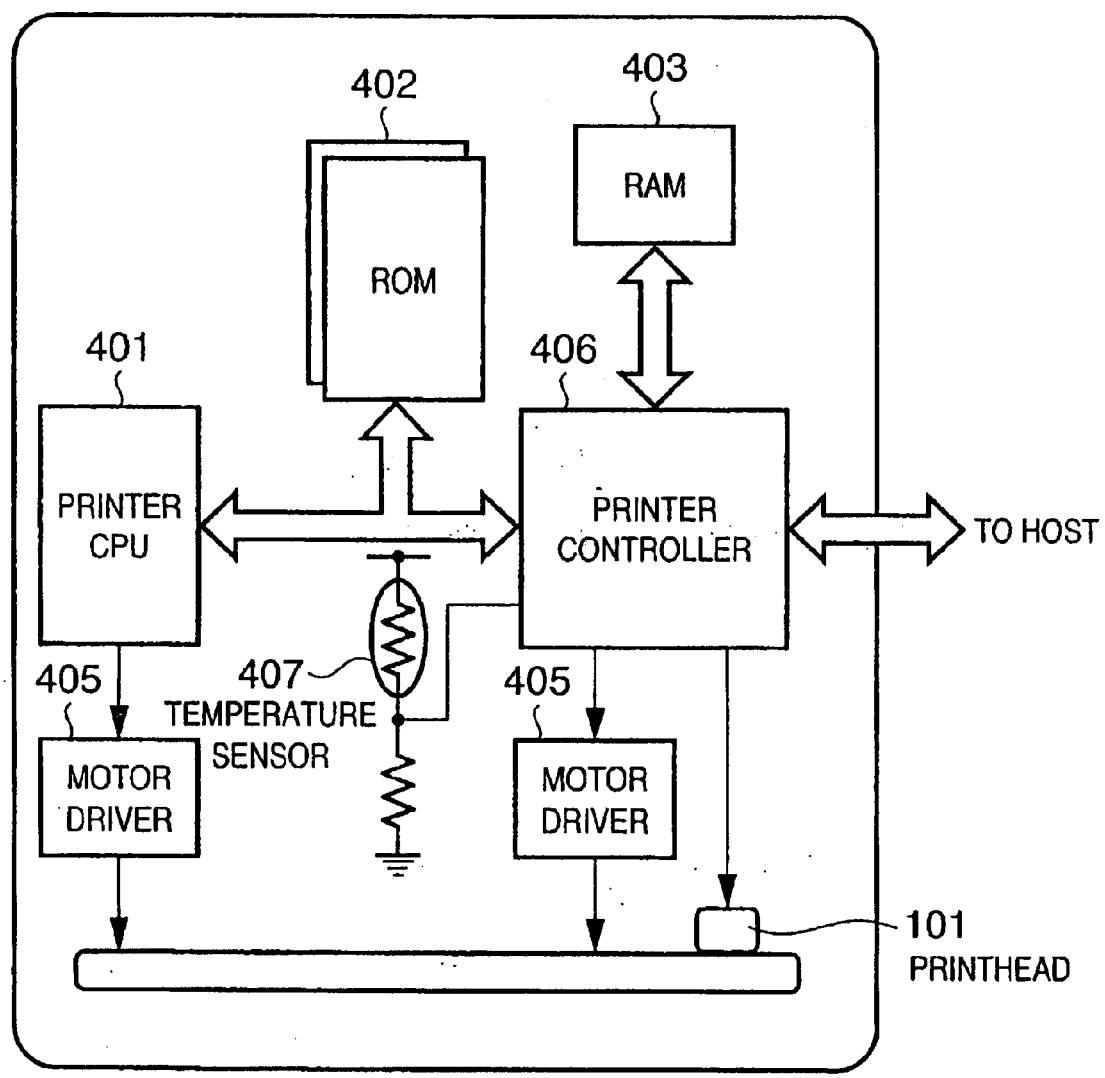
FIG. 2 is a block diagram for explaining the control arrangement of the printer shown in FIG. 1.

FIG. 2 is a block diagram for explaining the control arrangement of the printer shown in FIG. 1.

Referring to FIG. 2, reference numeral 401 denotes a CPU for controlling the printer of the printer apparatus. The CPU 401 controls printing processing using a printer control program stored in a ROM 402 or printer emulation and print fonts.

A RAM 403 stores rasterized data for printing or received data from a host. Reference numeral 101 denotes the printhead; and 405, a motor driver. A printer controller 406 controls access to the RAM 403, exchanges data with the host apparatus, and sends a control signal to the motor driver. A temperature sensor 407 formed from a thermistor or the like detects the temperature of the printer apparatus.

The CPU 401 reads out from the I/O data register in the printer controller 406 information such as an emulation command sent from the host apparatus to the printer apparatus and writes/reads control corresponding to the command in/from the I/O register and I/O port in the printer controller 406, while mechanically and electrically controlling the main body in accordance with the control program in the ROM 402.

Figure 3:
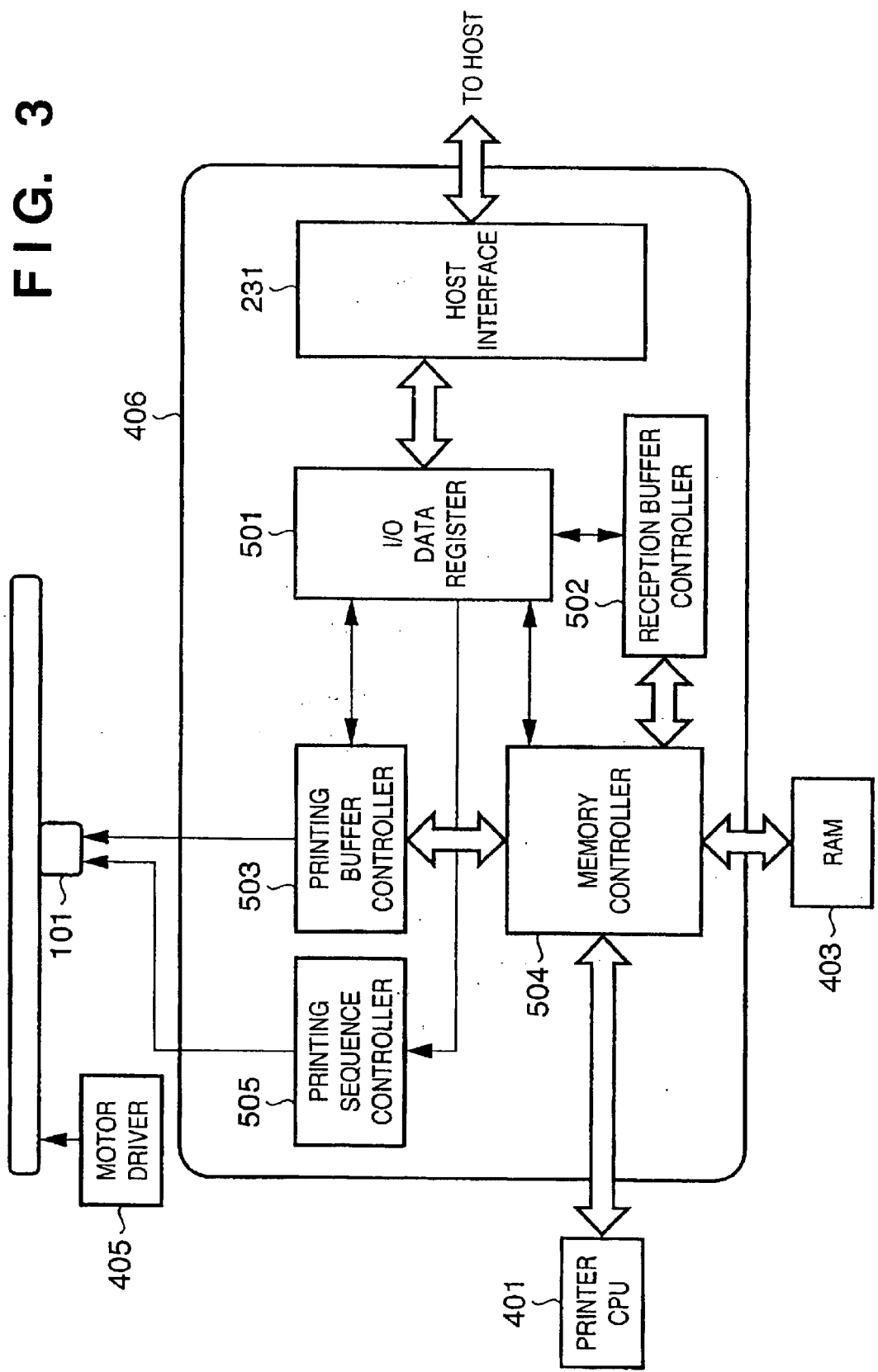
FIG. 3 is a block diagram for explaining the detailed arrangement of a printer controller shown in FIG. 2.

FIG. 3 is a block diagram for explaining the detailed arrangement of the printer controller 406 shown in FIG. 2. The same reference numerals as in FIG. 2 denote the same parts in FIG. 3.

Referring to FIG. 3, an I/O register 501 exchanges data with the host at the command level. A reception buffer controller 502 directly writes received data from the register in the RAM 403.

In printing, a printing buffer controller 503 reads out print data from the print data buffer of the RAM and sends the data to the printhead 101. A memory controller 504 controls three-directional memory access with respect to the RAM 403. A printing sequence controller 505 controls a printing sequence. A host interface 231 communicates with the host.

Figure 4:
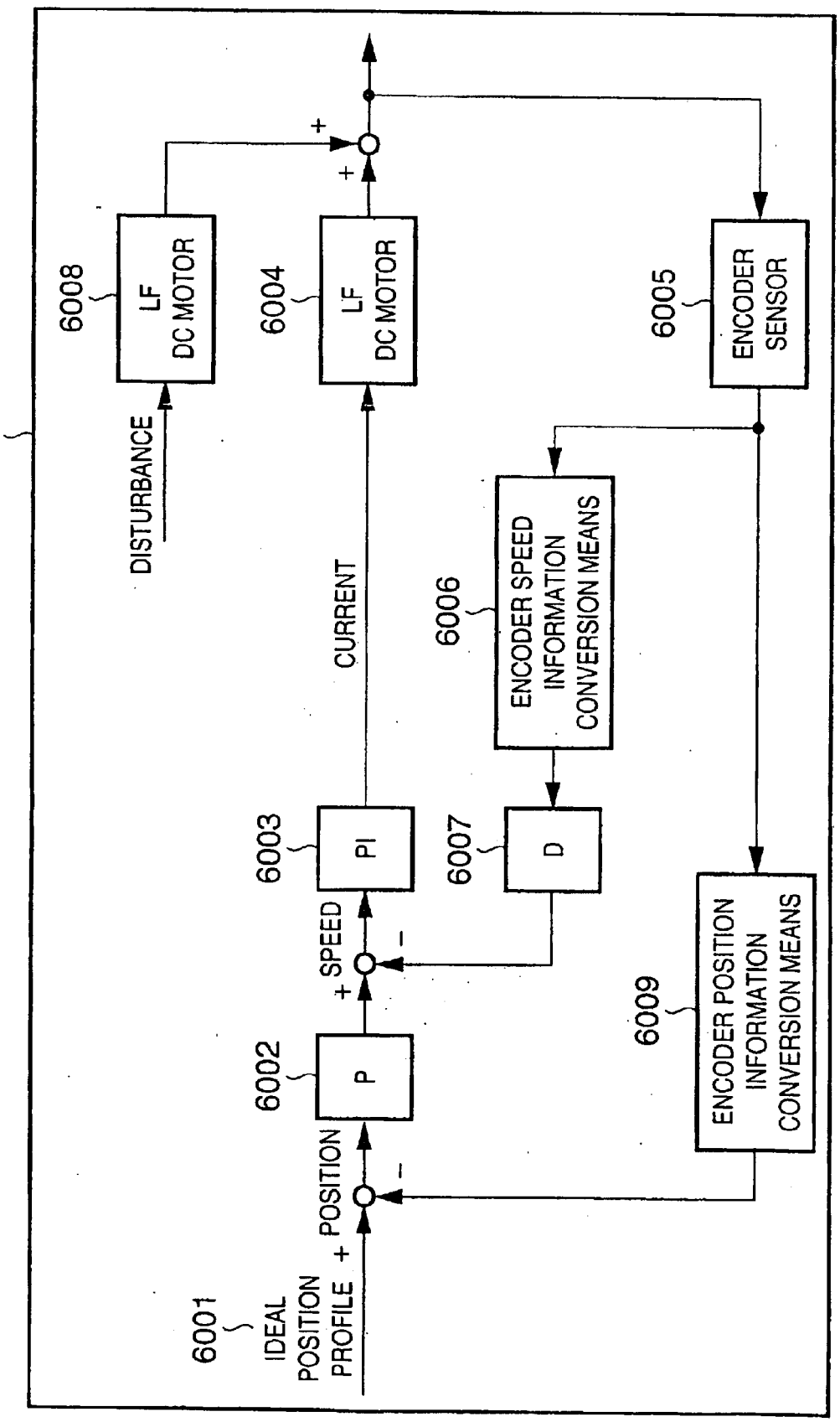
FIG. 4 is a block diagram showing a control procedure by position servo of a general DC motor.

FIG. 4 is a block diagram showing a control procedure (6000) so as to explain the position control system of a general DC motor. In this embodiment, position servo is used in the acceleration control region, constant speed control region, and deceleration control region. Such DC motor control is done by a method called PID control or classic control. The procedure will be described below.

A target position to be given to a control object is given by an ideal position profile 6001. In this embodiment, the target position corresponds to an absolute position at which a paper sheet conveyed by the line feed motor should arrive at given time. This position information changes as the time elapses. When tracking control is executed for the ideal position profile, drive control of this embodiment is done.

The apparatus has an encoder sensor 6005 to detect the physical rotation of the motor. An encoder position information conversion means 6009 obtains absolute position information by cumulatively adding the number of slits detected by the encoder sensor. An encoder speed information conversion means 6006 calculates the current driving speed of the line feed motor from the signal from the encoder sensor 6005 and a clock (timer) incorporated in the printer.

A numerical value obtained by subtracting the actual physical position obtained by the position information conversion means 6009 from the ideal position profile 6001 is transferred to feedback processing of position servo from a circuit 6002. The circuit 6002 is the major loop of position servo. Generally, a means for executing calculation related to a proportional term P is known.

As an arithmetic result of the circuit 6002, a speed command value is output. This speed command value is transferred to feedback processing of speed servo from a circuit 6003. As the minor loop of speed servo, a means for executing PID arithmetic operation for the proportional term P, integral term I, and derivative term D is generally used.

In this embodiment, to improve the followability when the speed command value has nonlinearly changed and also to prevent any influence of derivative operation in tracking control, a method generally called D-PI is shown. The encoder speed information obtained by the encoder speed information conversion means 6006 is passed through a derivative operation circuit 6007 before calculating the difference between it and the speed command value obtained by the circuit 6002. This method itself is irrelevant to the present invention. Derivative operation by the circuit 6003 sometimes suffices depending on the characteristics of the system to be controlled.

In the minor loop of speed servo, a numerical value obtained by subtracting encoder speed information from the speed command value is transferred to the PI arithmetic circuit 6003 as a speed error that is short of the target speed. An energy to be applied to the DC motor at that time is calculated by a method called PI arithmetic operation. Upon receiving the energy, the motor driver circuit changes the duty of the applied voltage using, e.g., a means (to be referred to as "PWM (Pulse Width Modulation) control" hereinafter) for changing the pulse width of the applied voltage while keeping the motor applied voltage unchanged. With this operation, the current value is adjusted, and the energy to be applied to a DC motor 6004 is adjusted, thereby controlling the speed.

The DC motor which rotates upon receiving the current value physically rotates while being influenced by the disturbance of a DC motor 6008. The output of the DC motor is detected by the encoder sensor 6005.

Figure 5:
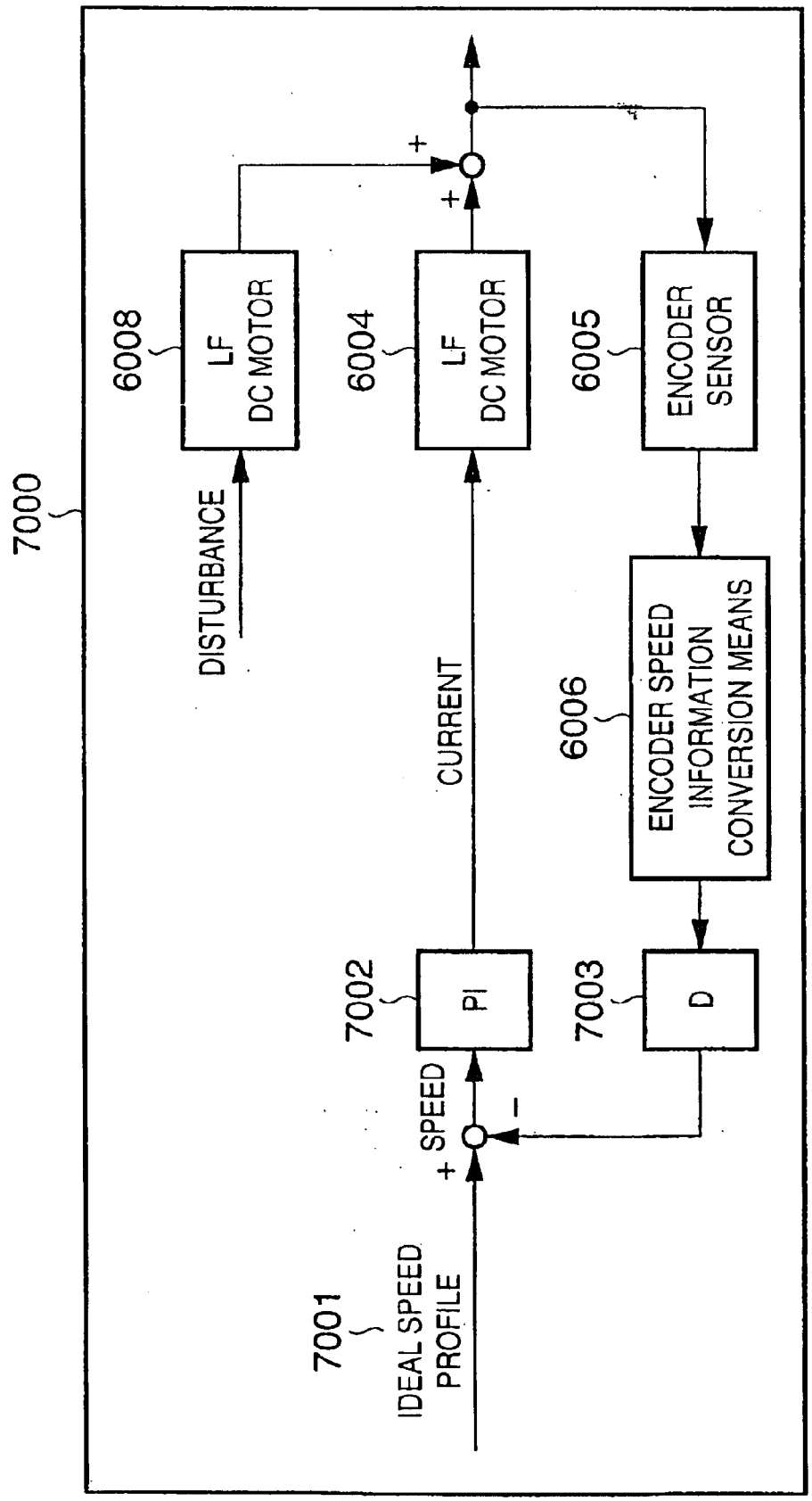
FIG. 5 is a block diagram showing a control procedure by speed servo of a general DC motor.

FIG. 5 is a block diagram for explaining a control procedure (7000) in speed servo of the general DC motor. In this embodiment, speed servo is used in the positioning control region. The DC motor is controlled by a method called PID control or classic control. The procedure will be described below.

A target speed to be given to a control object is given by an ideal speed profile 7001. In this embodiment, the target speed corresponds to an ideal speed at which a paper sheet should be conveyed by the line feed motor at given time. The target speed corresponds to a speed command value at the given time. This speed information changes as the time elapses. When tracking control is executed for the ideal speed profile, drive control of this embodiment is done.

In speed servo, a means for executing PID arithmetic operation for the proportional term P, integral term I, and derivative term D is generally used. In this embodiment, to improve the followability when the speed command value has nonlinearly changed and also to prevent any influence of derivative operation in tracking control, a method generally called D-PI is shown. The encoder speed information obtained by the encoder speed information conversion means 6006 is passed through a derivative operation means 7003 before calculating the difference between it and the speed command value obtained by the circuit 7001. This method itself is irrelevant to the present invention. Derivative operation by a circuit 7002 sometimes suffices depending on the characteristics of the system to be controlled.

In speed servo, a numerical value obtained by subtracting encoder speed information from the speed command value is transferred to the PI arithmetic circuit 7002 as a speed error that is short of the target speed. An energy to be applied to the DC motor at that time is calculated by a method called PI arithmetic operation. Upon receiving the energy, the motor driver circuit changes the duty of the applied voltage using, e.g., PWM control. With this operation, the current value is adjusted, and the energy to be applied to the DC motor 6004 is adjusted, thereby controlling the speed.

The DC motor which rotates upon receiving the current value physically rotates while being influenced by the disturbance of the DC motor 6008. The output of the DC motor is detected by the encoder sensor 6005.

Figure 6:
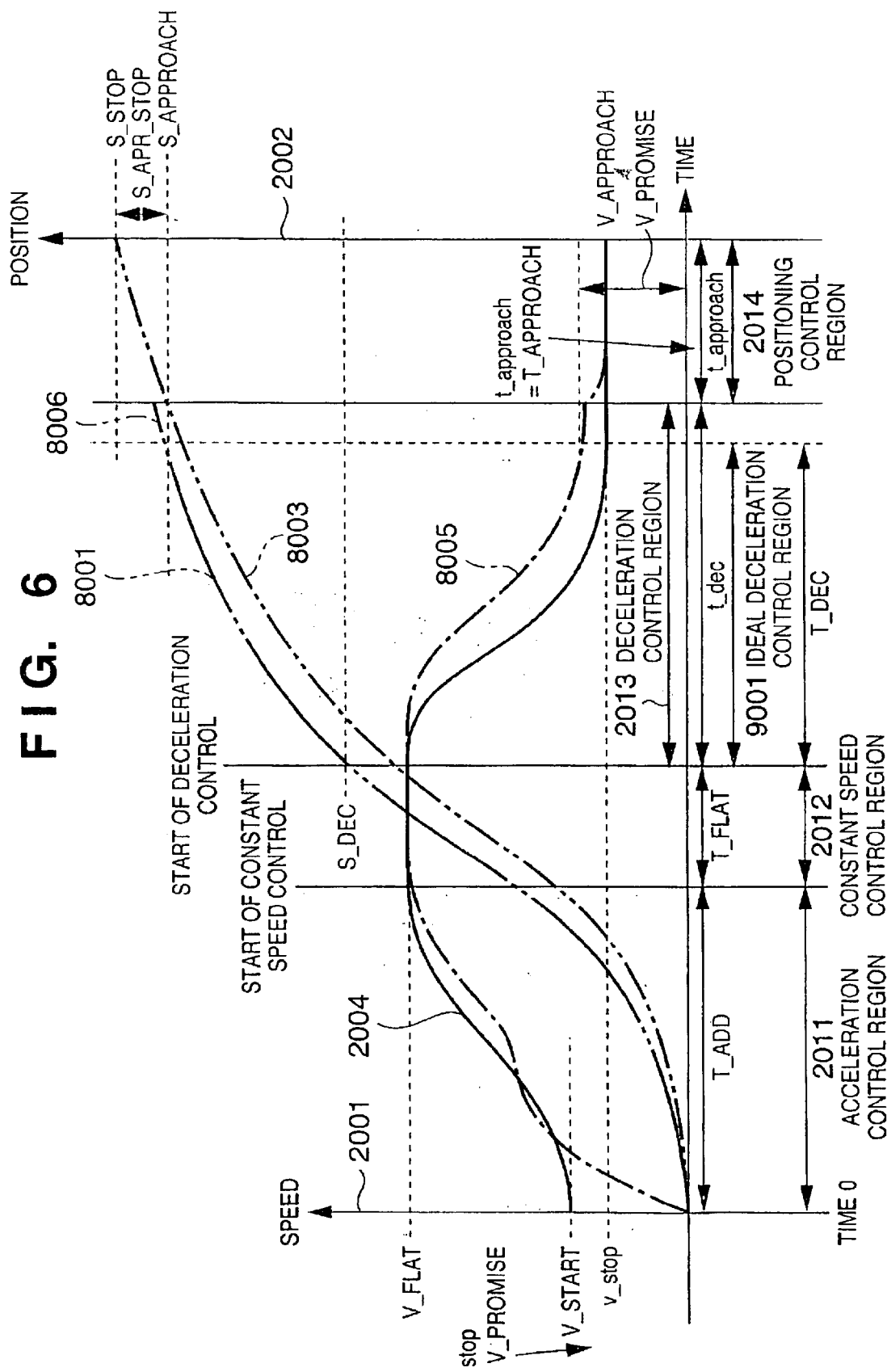
FIG. 6 is a timing chart for explaining in detail the influence of disturbance and actual control in controlling an LF motor.

FIG. 6 is a timing chart for explaining in detail the influence of disturbance and actual control in controlling an LF motor in this embodiment.

FIG. 6 shows a case wherein a speed v_stop immediately before stop ends as an average and ideal value V_APPROACH. Referring to FIG. 6, the abscissa indicates time, an ordinate 2001 indicates the speed, and an ordinate 2002 indicates the position.

In this embodiment, a constant value is indicated by upper-case letters, and a variable value is indicated by lower-case letters. When values with the same spelling are represented by both upper- and lower-case letters, the value indicated by upper-case letters represents an ideal constant value, and the value indicated by lower-case letters represents a variable value that can change for the value with the same content.

Reference numeral 8001 denotes an ideal position profile; and 2004, an ideal speed profile. The ideal position profile 8001 is formed from four control regions: an acceleration control region 2011, constant speed control region 2012, deceleration control region 2013, and positioning control region 2014.

In the ideal speed profile 2004, V_START denotes an initial speed; V_FLAT, a speed in the constant speed control region 2012; V_APPROACH, a speed in the positioning control region; and V_PROMISE, a highest speed value of the speed immediately before stop, which must always be kept to achieve the positioning accuracy performance. The speed v_stop immediately before stop is an actual value that changes to any value due to disturbance when actual driving is assumed. In consideration of a speed variation in actual driving, the value V_APPROACH must be set sufficient small such that the value v_stop does not exceed the value V_PROMISE for any variation in speed.

Figure 7:
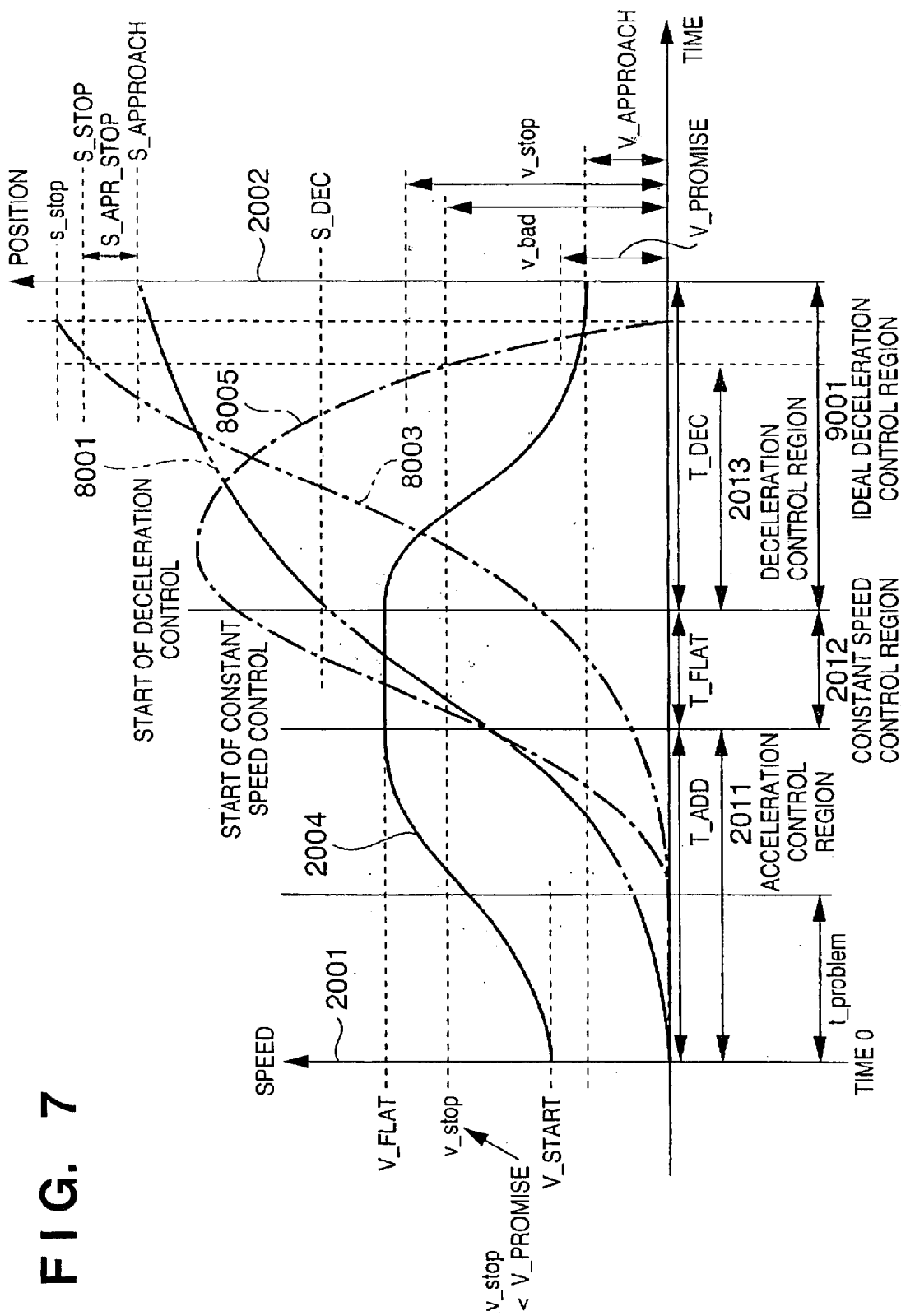
FIG. 7 is a timing chart for explaining the worst case that can occur when the initial value of the integral compensation amount is 0.
Figure 8:
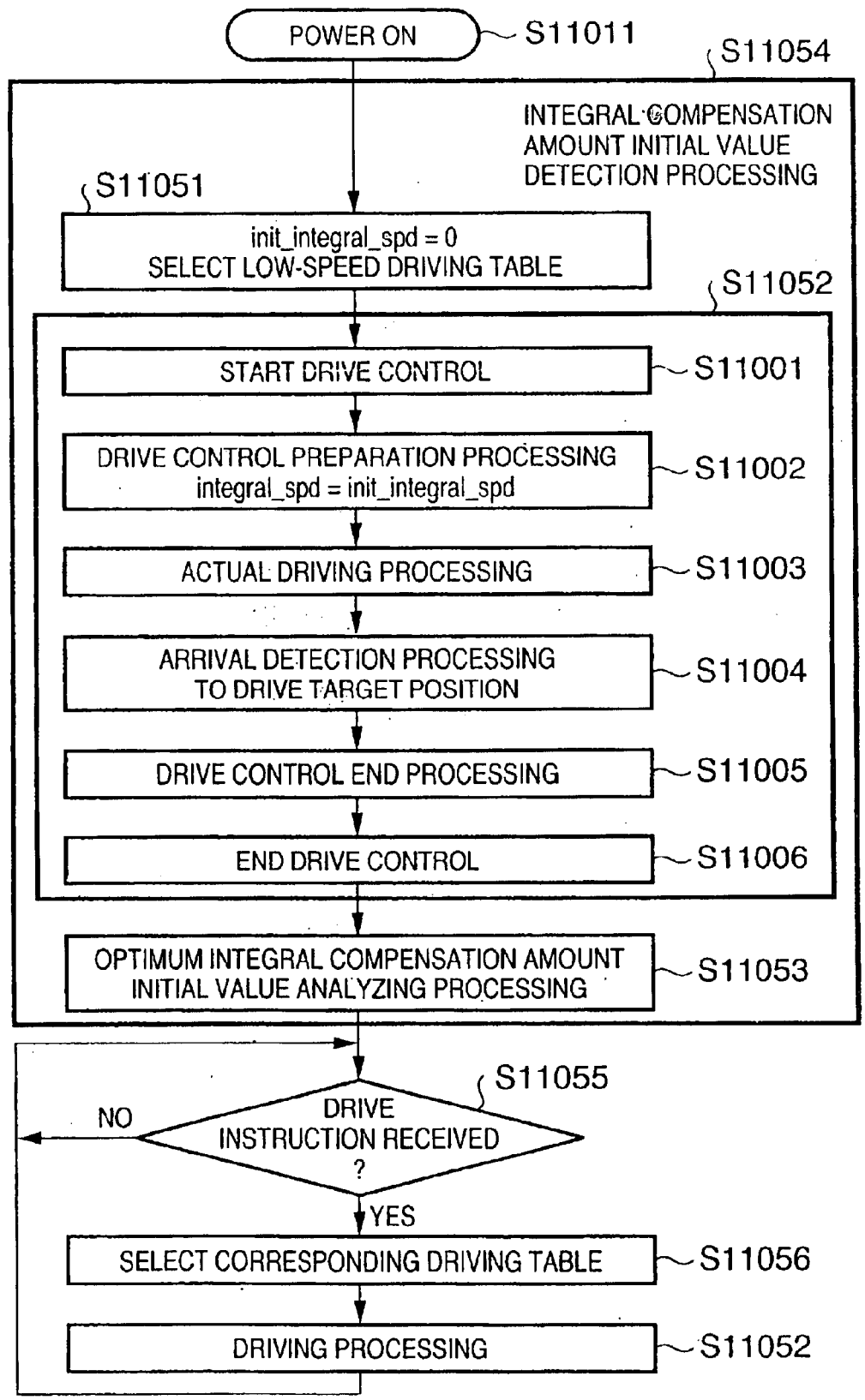
FIG. 8 is a flowchart showing the schematic flow of driving processing in the embodiment of the present invention.
Figure 9:
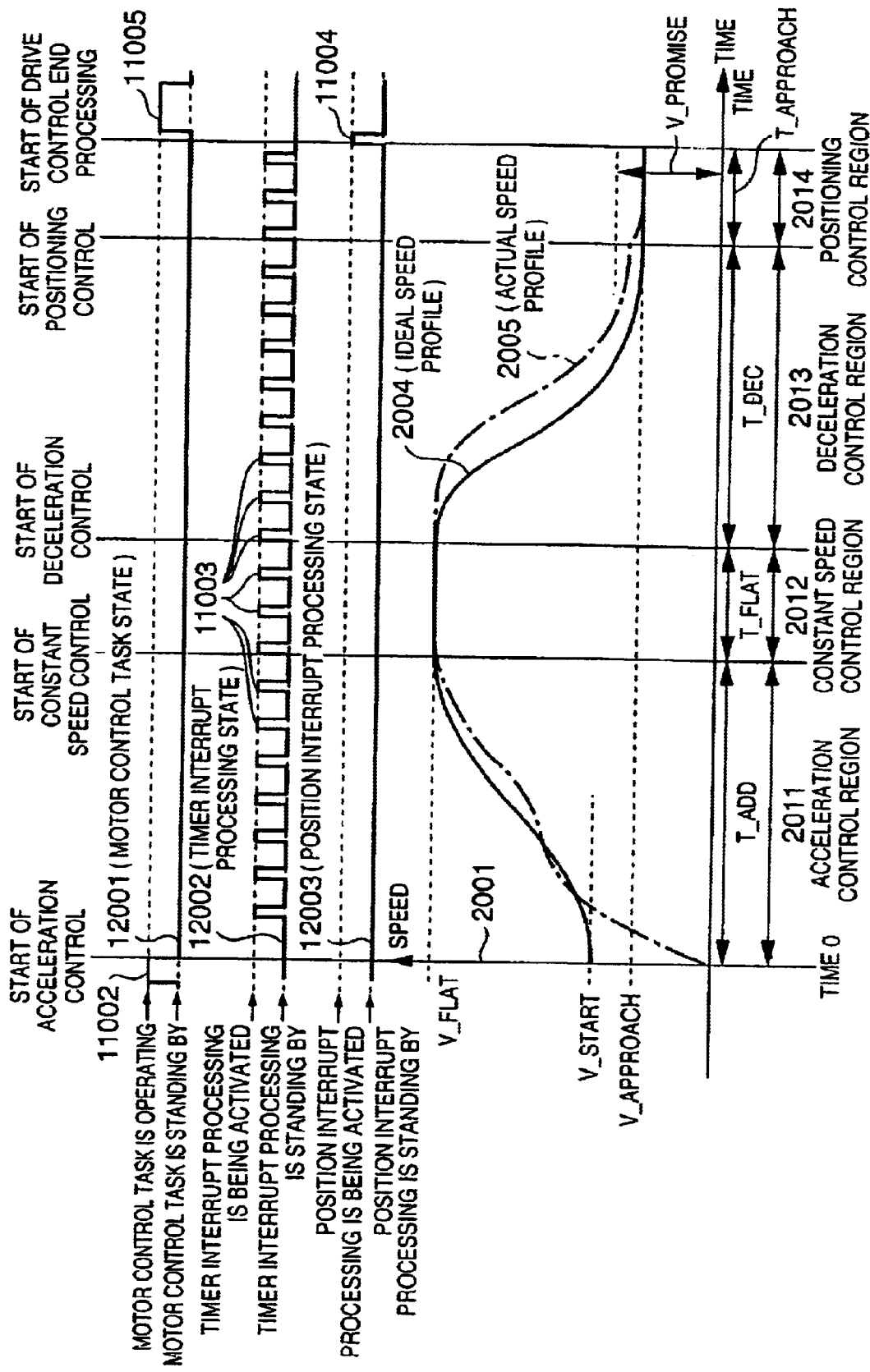
FIG. 9 is a timing chart showing timings of respective processing operations in FIG. 8.

In this embodiment, position servo is employed in the acceleration control region 2011, constant speed control region 2012, and deceleration control region 2013. Speed servo is employed in the positioning control region 2014. The curve 8001 shown in FIGS. 7, 8, and 9 represents the ideal position profile in position servo. The curve 2004 shown in FIGS. 7, 8, and 9 represents the ideal speed profile in speed servo and the required speed profile obtained for follow-up operation to the ideal position profile in position servo.

The ideal position profile 8001 is set in the regions 2011, 2012, and 2013 for position servo, though it is calculated only until S_APPROACH. This is because the ideal position profile is unnecessary from S_APPROACH because control is switched to speed servo from S_APPROACH. A time T_DEC required for deceleration in the ideal position profile 8001 is constant independently of actual driving. A control region corresponding to the time T_DEC is indicated by an ideal deceleration control region 9001.

An actual position profile 8003 represents the actual position when the influence of disturbance is present. In position servo, a delay is always generated. Hence, the actual position profile 8003 has a time delay with respect to an ideal position profile 8001. Hence, even when the ideal position profile 8001 is ended, the actual position is generally still before S_APPROACH. In the apparatus of this embodiment, a virtual ideal position profile 8006 is used as a command position value to position servo after the ideal position profile 8001 is ended until actual driving position reaches S_APPROACH.

The virtual ideal position profile 8006 is represented by a straight line extended from the terminal of the ideal position profile using the final gradient of the ideal position profile 8001.

Reference numeral 8005 means actual driving speed profile of the physical motor. Using the ideal position profile 8001 as an input, feedback control is executed to make the speed closer to the ideal speed even with a slight delay from the ideal speed profile as the positioning control region 2014 comes close to the end, thereby settling the final speed immediately before stop to the speed V_APPROACH at which the positioning accuracy performance can be achieved. Note that the shift from the deceleration control region 2013 to the positioning control region 2014 is done at the moment when the speed has reached S_APPROACH independently of the physical driving speed state.

S_DEC represents a position at which the constant speed control region 2012 is ended and the deceleration control region 2013 starts. Since S_DEC is a value determined by the ideal position profile 8001, it has nothing to do with the influence of disturbance in actual driving.

S_APPROACH represents a position at which the deceleration control region 2013 is ended and the positioning control region 2014 starts. S_STOP represents a stop position. T_ADD is a time required for the acceleration control region 2011. T_DEC is a time required for deceleration control region 2013. T_FLAT is a time required for the constant speed control region 2012. The time T_FLAT has a fixed value determined when the stop position S_STOP when the driving start position is defined as 0 is set, i.e., when the ideal position profile 8001 that satisfies the total driving distance is set.

T_APPROACH is a time required for the positioning control region 2014. T_APPROACH is a time required for the object to be drive-controlled to move by a distance S_APR_STOP from the position S_APPROACH at which the positioning control region 2014 starts to the stop position S_STOP in actual movement. FIG. 6 shows a case wherein the object to be drive-controlled has almost ideally moved through the positioning region. In actual control, the ideal physical operation is generally very difficult.

Additionally, t_approach is an actual variable value representing a time required for a positioning control region 2014 as an actual value that changes to any value due to disturbance when actual driving is assumed.

For high-speed accurate positioning, the curve of the ideal position profile 8001 must be tuned in accordance with the system. More specifically, the ideal position profile 8001 is preferably set such that the speed in the constant speed control region 2012 becomes as high as possible to improve the positioning required time performance so far as the system performance permits, the speed in the positioning control region 2014 becomes as low as possible to improve the positioning accuracy performance so far as the system performance permits, and the lengths of the acceleration control region 2011, deceleration control region 2013, and positioning control region 2014 become as short as possible to improve the positioning required time performance so far as the system performance permits. However, a more detailed tuning method is irrelevant to the present invention. Here, a description will be made assuming that the ideal position profile 8001 has already been optimized.

FIG. 7 is a timing chart for explaining the worst case that can occur when the initial value of the integral compensation amount is 0.

In an actual speed profile 8005 shown in FIG. 7, a time t_problem is required until an integral compensation amount that allows movement against the static frictional force is obtained. At last movement starts after the elapse of this time. Next, since feedback position servo is executed in a large amount to reduce positional deviation that has excessively increased during the time t_problem, the actual speed profile 8005 temporarily largely exceeds an ideal speed profile 2004.

As the positional deviation decreases, the speed drops. However, since the movement completely deviates from the driving profile that is optimized for the system to be controlled, the speed does not sufficiently decrease even near the stop position. Essentially, the position should reach S_STOP almost at a speed V_APPROACH after the elapse of time T_DEC. However, the position reaches S_STOP at a speed v_bad much higher than V_APPROACH before the elapse of time T_DEC. For this reason, overrun occurs beyond a position s_stop. The required accuracy cannot be specified.

FIG. 8 is a flowchart showing the schematic flow of driving processing in this embodiment. FIG. 9 is a timing chart showing timings of respective processing operations in FIG. 8.

When the apparatus is powered on in step S11011, integral compensation amount initial value detection processing, i.e., a characteristic feature of the present invention, of detecting the initial value of the integral compensation amount is executed in step S11054.

In the integral compensation amount initial value detection processing in step S11054, a value init_integral_spd that represents the initial value of the integral compensation amount is initialized to 0 in step S11051. In the present invention, it is important that the value is initialized to 0 only in step S11051. Additionally, an LF feed table to be used in the subsequent sequence is selected in step S11051. In this embodiment, the table selected here is a low-speed driving table, so driving by speed servo at a constant speed v_test is selected. Setting the speed v_test is directly related to the initial value of the integral compensation amount to be detected. The speed v_test is preferably set after appropriate tuning of the system. For example, the value V_APPROACH shown in FIG. 6 may be used.

When step S11051 is ended, driving processing by the corresponding table is executed in step S11052. The timings of respective processing operations in step S11052 are also shown in FIG. 9.

When drive control processing starts in step S11001, drive control preparation is done in step S11002. In this case, the initial value init_integral_spd of the integral compensation amount is substituted into a work region integral_spd to be actually used for feedback control. Processing in step S11002 is generally described in the motor control task. In addition to setting integral_spd, a table appropriate to the drive purpose is selected, T_FLAT that matches the drive amount is set, and reflection processing, i.e., the gist of the present invention, of reflecting a result of evaluation processing on the ideal speed profile to be used in the next driving cycle, and various work regions are set. Finally, a timer which controls timer interrupt processing is activated, and the preparation is ended.

When the timer is activated in step S11002, the flow advances to actual driving processing in step S11003. Step S11003 is processing that is generally described in timer interrupt processing. For example, an interrupt is executed every msec to read the value of the encoder, calculate by PID operation or the like the current value to be output, and output the value to the motor.

In parallel to the processing in step S11003, it is monitored in the system whether the position has arrived at the stop position S_STOP. When the arrival is detected, arrival detection processing 11004 to the drive target position is activated to generate an interrupt. The flow advances to drive control end processing in step S11005.

In step S11005, the output to the motor is quickly disabled, and the timer is stopped. The processing is ended in step S11006.

When the driving processing is ended, the flow advances to step S11053 to execute analysis to obtain the optimum integral compensation amount initial value.

When the integral compensation amount initial value detection processing in step S11054 is ended with the above procedure, the flow advances to step S11055 to wait for a drive instruction. In the printer system, every time an operation such as paper feed, printing, or discharge is performed, a paper convey drive instruction is issued. When the instruction is received, the flow advances to step S11056.

A driving table corresponding to the application purpose is selected. In step S11052, driving processing is executed.

Figure 10:
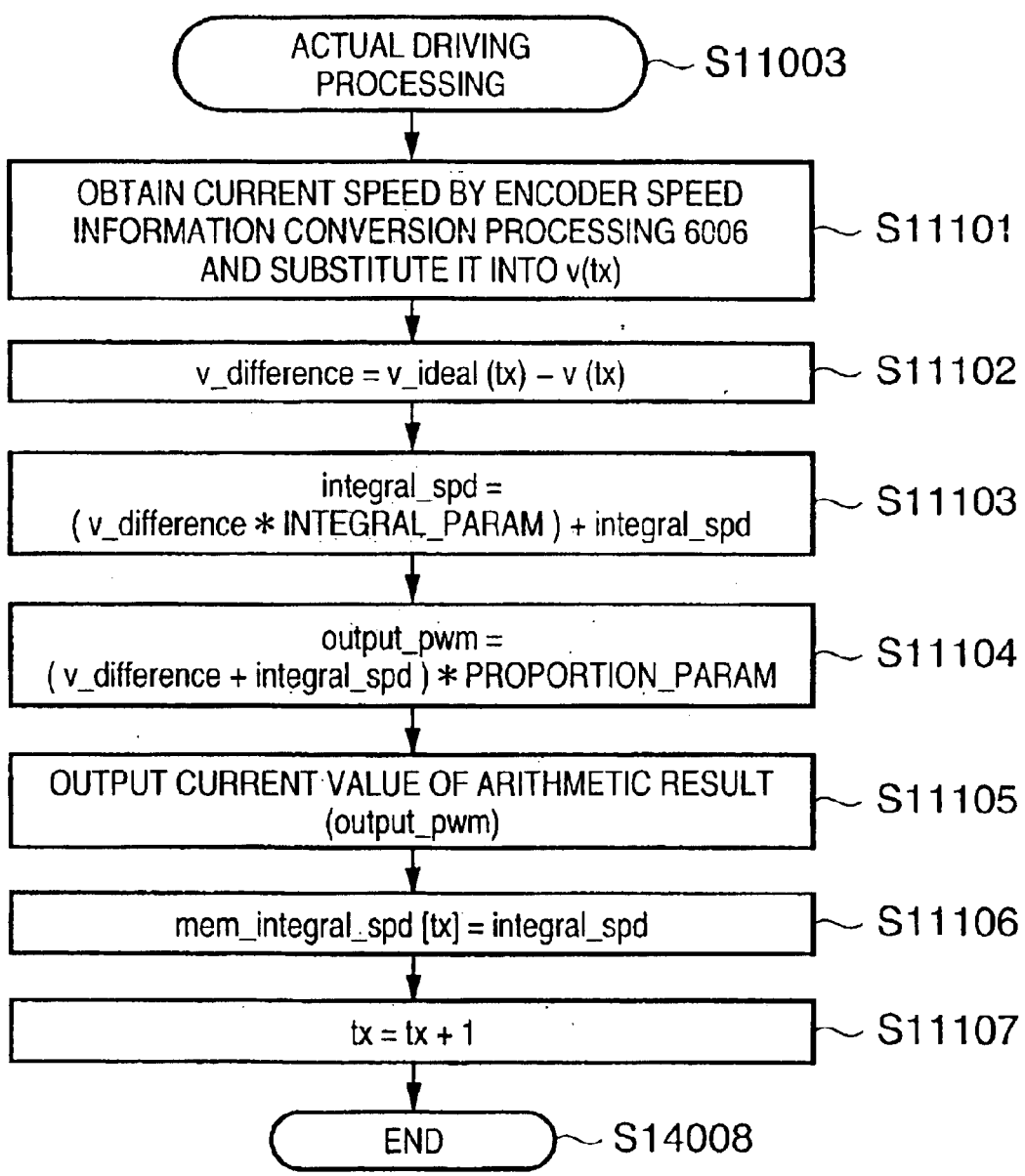
FIG. 10 is a flowchart showing details of processing executed in actual driving processing in FIG. 8.

FIG. 10 is a flowchart showing, for processing executed in the actual driving processing in step S11003 of FIG. 8, details of PI operation of the speed as a characteristic feature of the present invention.

In the entire processing executed in step S11003, various processing operations such P (proportional) operation of position in position servo and D (derivative) operation in the loop of speed servo are executed. Since these processing operations are known and are irrelevant to the present invention, a description thereof will be omitted.

When actual driving processing starts in step S11003, the current speed is obtained by an encoder speed information conversion means 6006 and substituted into v(tx) in step S11101. To simplify the description, a description of derivative operation 6007 in FIG. 4 and derivative operation 7003 in FIG. 5 will be omitted. Note that tx is corresponding time.

In step S11102, the difference between v(tx) and a value v_ideal(tx) of the ideal speed profile is calculated and substituted into v_difference. In speed servo, v_ideal(tx) is used as the value of the ideal speed profile. In position servo, a result of P operation 6002 is used, as described with reference to FIG. 4.

In this embodiment, in executing the integral compensation amount initial value detection processing in step S11054, v_test is used as v_ideal(tx). In this case, v_ideal(tx) is a constant value that does not depend on a change in time.

In step S11103, the integral compensation amount integral_spd at tx is calculated using a constant value INTEGRAL_PARAM preset as an integral gain. This processing is generally called integral operation.

In step S11104, a final output current value output_pwm is calculated using a constant value PROPORTION_PARAM preset as a proportion gain. This processing is generally called proportional operation.

In step S11105, the arithmetic result is output to the object to be driven. In step S11106, the integral compensation amount integral_spd at the time tx is stored in an array mem_integral_spd[tx]. The array mem_integral_spd[tx] serves as a region for storing information to be used in step S11053.

In step S11107, the counter tx representing time is incremented. The processing is ended in step S14008.

Figure 11:
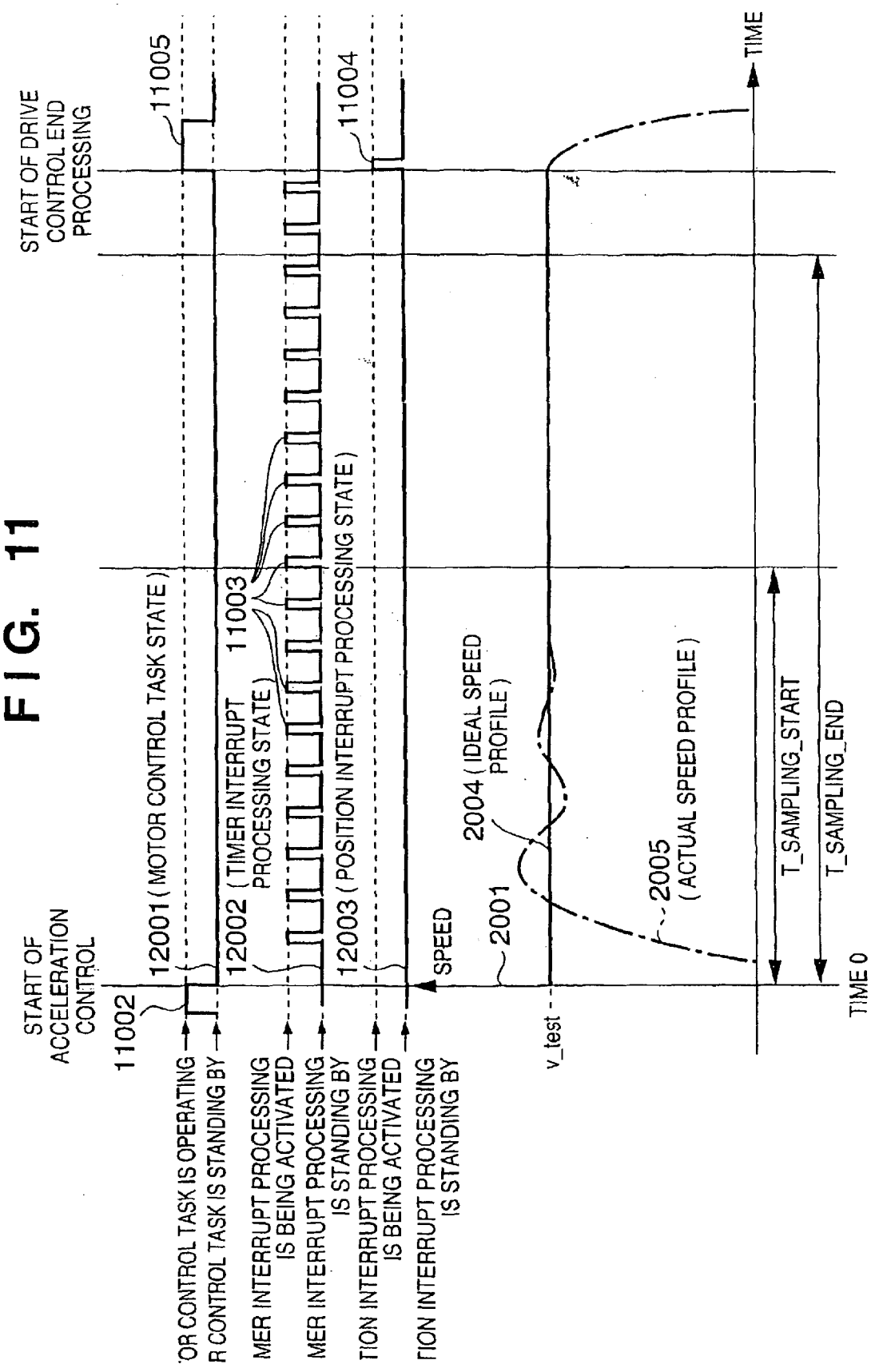
FIG. 11 is a timing chart showing driving when integral compensation amount initial value detection processing is activated.

FIG. 11 is a timing chart showing driving when the integral compensation amount initial value detection processing in step S11054 is activated.

The speed command value is fixed at v_test. On the other hand, the integral compensation amount integral_spd starts from 0. For this reason, an actual profile 2005 starts with a slight delay from time 0. After that, the speed varies in the vertical direction with respect to v_test before the elapse of a predetermined time and converges to v_test soon.

In the apparatus of this embodiment, time in which the up-and-down variation in actual driving profile with respect to v_test is expected to converge to an allowable level under the above condition is defined as T_SAMPLING_START. The integral compensation amount from this time is used in optimum integral compensation amount initial value analyzing processing (S11053). T_SAMPLING_END represents time when the data to be used in the optimum integral compensation amount initial value analyzing processing (S11053) has been sampled.

As will be described later, in step S11053, integral compensation amounts recorded from T_SAMPLING_START to T_SAMPLING_END are averaged. Hence, a slight up-and-down variation in speed in this interval does not degrade the effect of this embodiment. If the time region required for rising from speed 0 to v_test can be cut by T_SAMPLING_START, a sufficient effect can be expected in the apparatus of this embodiment.

Figure 12:
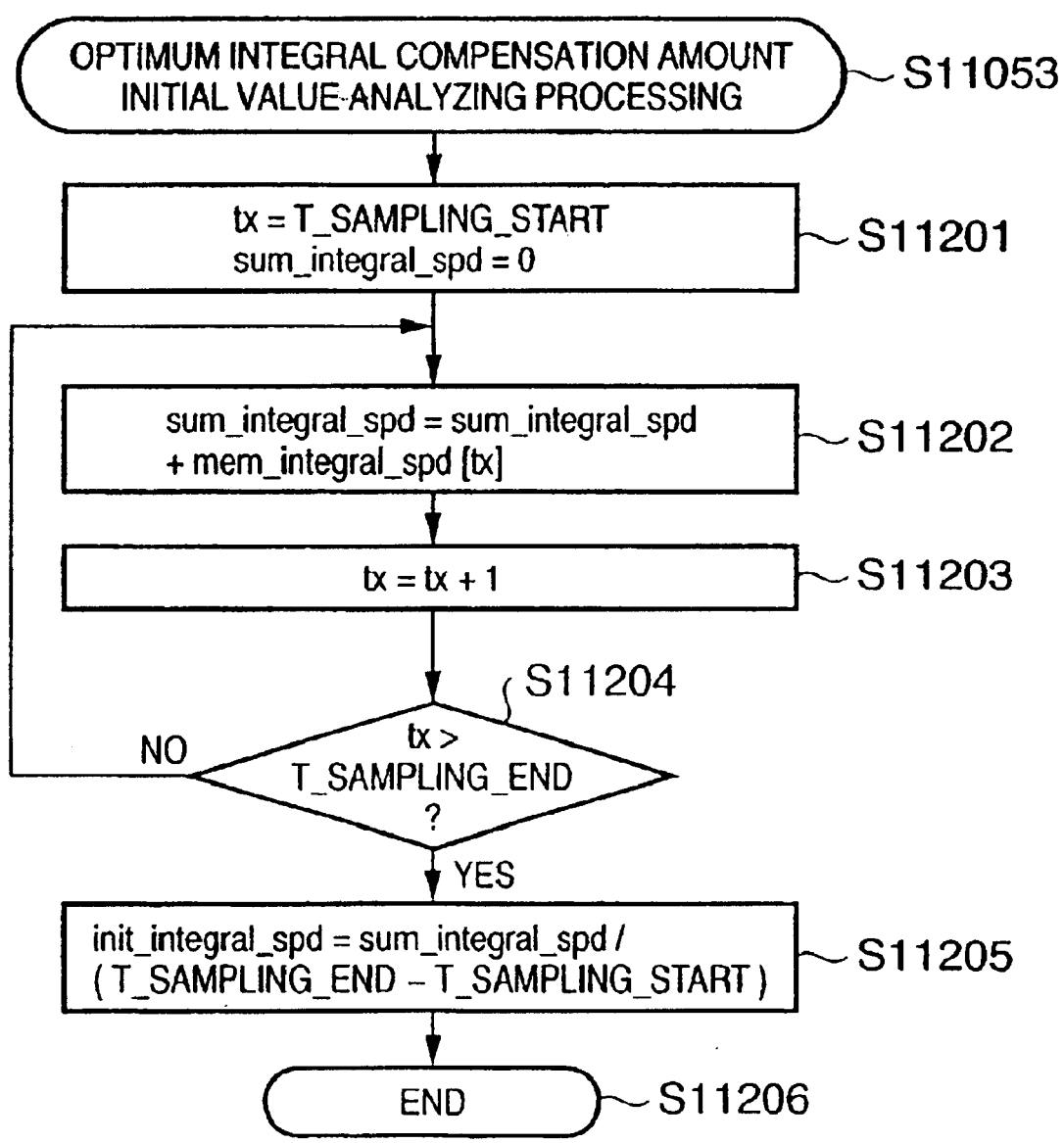
FIG. 12 is a flowchart showing details of optimum integral compensation amount initial value analyzing processing in FIG. 8.

FIG. 12 is a flowchart showing details of optimum integral compensation amount initial value analyzing processing in step S11053 shown in FIG. 8.

In step S11201, the counter tx used for access to data is initialized, and a work region sum_integral_spd used to calculate the sum value is initialized.

In steps S11202, S11203, and S11204, the sum of integral compensation amounts recorded from T_SAMPLING_START to T_SAMPLING_END is acquired. In step S11205, the average value of integral compensation amounts is calculated and substituted into init_integral_spd. The processing is ended in step S11206.

With the above-described processing, the initial value of the integral compensation amount in a normal driving mode equals the initial value of the integral compensation amount during constant speed driving using v_test. That the integral compensation amount can allow constant speed driving using v_test means that the integral compensation amount corresponds to an output current value that allows movement against the static frictional force.

Hence, when the operation shown in FIG. 7 is executed by the apparatus of this embodiment, the output current value has a value already sufficient for movement against the static frictional force at time 0. Hence, the time t_problem until the start of actual operation can be shortened, and the followability for the ideal profile improves. When v_test is set at V_APPROACH, the initial value of the integral compensation amount detected in this state rarely triggers speed overshoot with respect to V_FLAT.

As has been described above, according to this embodiment, the initial value of the integral compensation amount optimum for starting the driving mechanism can be obtained independently of the variation in operation frictional force of the mechanical portion of an individual apparatus or static frictional force of a printing medium to be driven, or the difference in use environment. High-speed accurate control can be realized using this value.

[Other Embodiments]

In the above embodiments, the present invention is applied to control a (line feed) motor for printing medium conveyance in a serial inkjet printer. However, the present invention can be applied not only to an inkjet printer but also to various kinds of devices using motors.

In the above embodiments, the present invention is applied to control a DC motor. However, the present invention can be applied not only to a DC motor but also to any other motor for which feedback control such as tracking control is possible.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments being realized by executing the program codes which are read by a computer, the present invention includes a case where an OS (operating system) or the like working on the computer performs a part of or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

If the present invention is realized as a storage medium, program codes corresponding to the above mentioned flowcharts (FIGS. 8, 10 and/or FIG. 12) are to be stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. A motor control method in a device which drives a mechanism using a motor as a power source, comprising:

a pre-driving step of providing a predetermined speed command to the motor and driving the mechanism;

a parameter calculation step of, in the pre-driving step, monitoring a driving condition of the mechanism and calculating a parameter corresponding to a current value to be supplied to the motor;

a profile generation step of generating a position profile representing a relationship between time and a position and a speed profile representing a relationship between time and a speed; and a control step of controlling the driving of the mechanism by dividing the driving into at least three regions including an acceleration region, a deceleration region and a positioning region, the mechanism being driven in accordance with the position profile in the acceleration region and the deceleration region, and the mechanism being driven in accordance with the speed profile in the positioning region, wherein the parameter is used as an initial value for feedback control in the positioning region.

2. The method according to claim 1, wherein in the parameter is an integral compensation amount to be used in the feedback control.

3. The method according to claim 2, wherein a value of the predetermined speed command represents a speed in the positioning region.

4. The method according to claim 1, wherein the motor is a DC motor.

5. A computer program which causes a computer to realize a motor control method in a device which drives a mechanism using a motor as a power source, said program comprising program codes of:

a pre-driving step of providing a predetermined speed command to the motor and driving the mechanism;

a parameter calculation step of, in the pre-driving step, monitoring a driving condition of the mechanism and calculating a parameter corresponding to a current value to be supplied to the motor;

a profile generation step of generating a position profile representing a relationship between time and a position and a speed profile representing a relationship between time and a speed; and a control step of controlling the driving of the mechanism by dividing the driving into at least three regions including an acceleration region, a deceleration region and a positioning region, the mechanism being driven in accordance with the position profile in the acceleration region and the deceleration region, and the mechanism being driven in accordance with the speed profile in the positioning region, wherein the parameter is used as an initial value for feedback control in the positioning region.

6. A storage medium which stores codes of a program which realizes a motor control method in a device which drives a mechanism using a motor as a power source, said program comprising:

a pre-driving step of providing a predetermined speed command to the motor and driving the mechanism;

a parameter calculation step of, in the pre-driving step, monitoring a driving condition of the mechanism and calculating a parameter corresponding to a current value to be supplied to the motor;

a profile generation step of generating a position profile representing a relationship between time and a position and a speed profile representing a relationship between time and a speed; and a control step of controlling the driving of the mechanism by dividing the driving into at least three regions including an acceleration region, a deceleration region and a positioning region, the mechanism being driven in accordance with the position profile in the acceleration region and the deceleration region, and the mechanism being driven in accordance with the speed profile in the positioning region, wherein the parameter is used as an initial value for feedback control in the positioning region.

7. A motor control apparatus in a device which drives a mechanism using a motor as a power source, comprising:

pre-driving means for giving a predetermined speed command to the motor and driving the mechanism;

parameter calculation means for, during the pre-driving, monitoring a driving condition of the mechanism and calculating a parameter corresponding to a current value to be supplied to the motor;

profile generation means for generating a position profile representing a relationship between time and a position and a speed profile representing a relationship between time and a speed; and control means for controlling the driving of the mechanism by dividing the driving into at least three regions including an acceleration region, a deceleration region and a positioning region, the mechanism being driven in accordance with the position profile in the acceleration region and the deceleration region, and the mechanism being driven in accordance with the speed profile in the positioning region, wherein the parameter is used as an initial value for feedback control in the positioning region.

8. The apparatus according to claim 7, wherein
the parameter is an integral compensation amount to be used in the feedback control.

9. The apparatus according to claim 8, wherein a value of the predetermined speed command represents a speed in the positioning region.

10. The apparatus according to claim 7, wherein the motor is a DC motor.

11. A motor control method in a device which drives a convey mechanism for conveying a printing medium using a motor as a power source by using feedback control, comprising:

a first driving step of driving the convey mechanism at a predetermined value by providing to the motor a predetermined speed command value, which represents a speed lower than a constant speed for conveying the printing medium after completion of an acceleration;

a calculation step of calculating a value corresponding to a current value to be supplied to the motor, during the driving of the convey mechanism in the first driving step; and a second driving step of driving the convey mechanism, in response to an instruction to convey the printing medium, using the value calculated in the calculation step to start the driving.

12. The method according to claim 11, wherein the value is used as a parameter for integral calculus processing in the feedback control.

13. The method according to claim 12, wherein in the calculation step, the parameter is calculated a plurality of times within a predetermined period after a start of the first driving step.

14. A motor control device for driving a convey mechanism for conveying a printing medium using a motor as a power source by using feedback control, comprising:

first driving means for driving the convey mechanism at a predetermined value by providing to the motor a predetermined speed command value, which represents a speed lower than a constant speed for conveying the printing medium after completion of an acceleration;

calculation means for calculating a value corresponding to a current value to be supplied to the motor, during the driving of the convey mechanism by the first driving means; and second driving means for driving the convey mechanism, in response to an instruction to convey the printing medium, using the value calculated by the calculation means to start the driving.

15. The device according to claim 14, wherein the value is used as a parameter for integral calculus processing in the feedback control.

16. The device according to claim 15, wherein the calculation means calculates the parameter a plurality of times within a predetermined period after a start of the driving by the first driving means.

* * * * *

UNITED STATES PATENT AND TRADEMARK OFFICE
CERTIFICATE OF CORRECTION

| | |
|---|---|
| PATENT NO. | : 6,823,132 B2 |
| APPLICATION NO. | : 10/144937 |
| DATED | : November 23, 2004 |
| INVENTOR(S) | : Saito et al. |

It is certified that error appears in the above-identified patent and that said Letters Patent is hereby corrected as shown below:

ON THE TITLE PAGE:

At (56) References Cited - U.S. Patent Documents:

"Kobayaski et al." should read --Kobayashi et al.--.

At (56) References Cited - Foreign Patent Documents:

"01026386" should read --1-26386--.
"09202014" should read --9-202104--.
"2000056634" should read --2000-56634--.
"2001246827" should read --2001-246827--.

UNITED STATES PATENT AND TRADEMARK OFFICE
CERTIFICATE OF CORRECTION

PATENT NO. : 6,823,132 B2
APPLICATION NO. : 10/144937
DATED : November 23, 2004
INVENTOR(S) : Saito et al.

It is certified that error appears in the above-identified patent and that said Letters Patent is hereby corrected as shown below:

IN THE DRAWINGS:

Delete Fig. 11, and Sheet 11 of 12, Fig. 11, the left margin is incomplete and the figure should be depicted as follows:

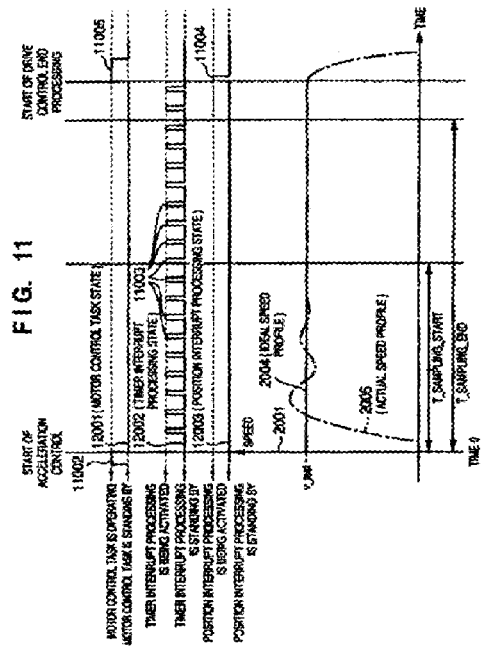

Signed and Sealed this

Twentieth Day of May, 2008

JON W. DUDAS
*Director of the United States Patent and Trademark Office*